(12) United States Patent
Allingham

(10) Patent No.: US 6,249,831 B1
(45) Date of Patent: Jun. 19, 2001

(54) HIGH SPEED RAID CACHE CONTROLLER USING ACCELERATED GRAPHICS PORT

(75) Inventor: Donald Allingham, Ft. Collins, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/239,628

(22) Filed: Jan. 29, 1999

(51) Int. Cl.[7] .................................................. G06F 13/40
(52) U.S. Cl. ........................ 710/126; 710/129; 711/114
(58) Field of Search ................................. 710/126–130; 711/111–114

(56) References Cited

U.S. PATENT DOCUMENTS 5,892,964 * 4/1999 Horan et al. ............................ 712/33
6,085,269 * 7/2000 Chan et al. ........................... 710/100

\* cited by examiner

*Primary Examiner*—Sumati Lefkowitz
(74) *Attorney, Agent, or Firm*—Duft, Graziano & Forest, P.C.

(57) ABSTRACT

The high-speed, multi-device PCI bus communication system of the invention includes a host CPU and a chip set for connecting the host CPU to a first, low speed PCI bus. The chip set has an accelerated graphics port. A VLSI device such as a RAID cache controller includes two PCI interfaces for communicating with second and third, higher speed PCI buses, and includes an accelerated graphics interface for communicating with the accelerated graphics port. A first PCI bridge provides for communication between the accelerated graphics interface and the first PCI interface; and a second PCI bridge provides for communication between the accelerated graphics interface and the second PCI interface. A dedicated communication bus connects the accelerated graphics interface to the accelerated graphics port. A RAM port can connect the VLSI device to external RAM. The system provides for coupling multiple (e.g., six) high speed SCSI devices to the second and third buses, operating at 66 MHz or more, and for coupling utility devices (e.g., ISA devices) to the first PCI bus operating at lesser speeds, e.g., 33 MHz. Communication between the host CPU and the RAID controller is performed over the dedicated communication bus directly through the chip set AGP, thereby freeing up the first, low-speed PCI bus for use with lower-speed utility devices and not impacting other RAID data traffic.

21 Claims, 3 Drawing Sheets

HIGH SPEED RAID CACHE CONTROLLER USING ACCELERATED GRAPHICS PORT

BACKGROUND OF THE INVENTION

PCI stands for "peripheral component interface" defined by the PCI Special Interest Group in an effort to stem development of various local bus architectures. PCI bus communications include transactions between "master" and "slave" devices connected to the bus. The prior art is familiar with PCI bus architectures and master-slave communication protocols.

The prior art is also familiar with PCI bridge chips that connect together two PCI buses. These bridge chips can be used, for example, in transferring data from an initiating PCI bus to a target PCI bus. One prior art bridge chip is the DEC21154 chip from Intel, for example. These prior art bridge chips generally provide for sequential transfer of large bursts of data across the bridge.

FIG. 1 shows a prior art PCI bridge chip 10 connected between two PCI buses P1 and P2 in a dual PCI bus system 8. As known in the art, host CPU 14 (e.g., a central processing computer board with a Pentium microprocessor) can connect to the PCI bus P1 through its north-bridge chip set 14a, as shown. One exemplary chip set 14a, for example, is the Intel 440LX chip set. The PCI bridge chip 10 can also include a system accelerator 10b, and can connect to SDRAM 10a, used to store large burst data from the bridge 10.

Various devices can also connect to the PCI buses P1, P2. By way of example, devices S1 and S2 connect, respectively, to PCI bus P1 and P2 and the chip set 14a can drive the devices S1 and S2 across the buses P1, P2. Devices S1, S2 can for example be SCSI or Fibre Channel chips which interface to a storage bus 18 (typically either SCSI or Fibre Channel), as shown. Storage devices typically connect to SCSI buses 18, as illustrated by SCSI device 16 connected to bus P2. SCSI device 16 interfaces to SCSI bus 18 which connects to disk drive 19. In a typical example, the host CPU 14 issues a write command to the device 16 from primary PCI bus P1 to secondary PCI bus P2 through bridge chip 10. FIG. 1 also shows a south-bridge chip set 14b which connects to ISA bus 21, as known in the art.

Standard PCI buses P1 and P2 provide a 32-bit, 33 MHz interface. Later generation chip sets 14 however support 66 MHz processing speeds. Faster bus speeds such as 66 MHz are thus desirable to support the newer chip sets 14 and to increase overall system processing power. However, higher bus speeds present problems in prior art systems such as system 8: as the bus speed increases, the number of devices (e.g., devices S1, S2, 16) connected to the buses P1, P2 must decrease. For example, at 33 MHz, ten devices can connect to the buses P1, P2; yet only four devices can connect to the buses P1, P2 at 66 MHz bus speeds. Accordingly, 66 MHz is not possible for buses P1 and P2, as illustrated in FIG. 1, since there are too many devices connected to the buses.

This problem associated with increasing PCI bus speed affects a variety of PCI bus systems and controllers, including the RAID (Redundant Array of Inexpensive or Independent Disks) controller. A host server typically connects to the RAID controller via a SCSI (Small Computer System Interface) interface; and the bridge chip connects between dual PCI buses within the controller. One of the PCI buses provides connectivity to dual SCSI devices coupled to external disk drives functioning as the RAID storage. In that most RAID cache controllers of the prior art use the system PCI bus to handle data traffic, the bus is shared by many devices, reducing the rate of transfer between the host server CPU (central processing unit) and the RAID controller.

FIG. 1A illustrates the problem further by showing one prior art RAID cache controller 20. The controller 20 includes PCI interfaces 22a, 22b, which connect, respectively, to PCI buses 24a and 24b. Interfaces 22 route data onto appropriate internal buses 26, 28 within the controller 20 according to PCI addressing. For example, interface 22 can route command data onto bus 26 and into PCI bridge 30 (e.g., bridge chip 10, FIG. 1); while routing burst data onto bus 28, through the system accelerator 32 and into SDRAM 20a, e.g., SDRAM 10a, FIG. 1. The architecture of controller 20 illustrates the competition which occurs on the PCI bus between (a) communication from the host chip set, e.g., chip set 14a, FIG. 1, to the controller's accelerator 32 and RAM 20a and (b) inter-PCI bus communication between the chip set and the target PCI bus, e.g., bus 24a to bus 24b communication.

One object of the invention is thus to provide a high speed processor-independent interface between a host CPU and its RAID controller. Another object of the invention is to provide systems and methods for isolating the RAID controller's PCI buses from the CPU's chip set to operate at higher bus speeds, even if the chip set's PCI bus operates at a lower bus speed. Yet another object of the invention is to provide a RAID cache controller which eliminates the above-mentioned bus competition problems. These and other objects will become apparent in the description that follows.

SUMMARY OF THE INVENTION

Current PCI chip sets provide an accelerator graphics port ("AGP"), used with graphic controllers, that operates at a higher speed and bandwidth than the chip set's PCI bus. By way of example, current chip sets connect to PCI buses with a 32-bit, 33 MHz interface; yet often provide an AGP that provides a higher 66 MHz or 133 MHz path, which is 2–3 times greater than the PCI bandwidth.

In one aspect, the invention provides a RAID cache controller with an accelerated graphics interface to connect the controller to an accelerated graphics port of a host CPU chip set. A first PCI bus interface couples the controller to a first PCI bus; and a second PCI bus interface couples the controller to a second PCI bus. A RAM port connects the controller to external RAM, and a first internal bus connects the RAM port to the first and second PCI interfaces. A first PCI bridge connects the accelerated graphics interface to the first PCI bus interface; and a second PCI bridge connects the accelerated graphics port to the second PCI bus interface. An accelerator, coupled to the accelerated graphics interface, communicates with the chip set without competition on the first and second PCI buses.

In another aspect, a second internal bus couples the accelerator to the RAM port.

In still another aspect, a third internal bus couples the first PCI bridge interface between the accelerated graphics interface and the first PCI interface.

In another aspect, a fourth internal bus couples the second PCI bridge interface between the accelerated graphics interface and the second PCI interface.

The invention also provides for a high-speed, multi-device PCI bus communication system, including a host CPU and a chip set (with an accelerated graphics port) for connecting the host CPU to a first PCI bus. A VLSI device (e.g., a RAID cache controller) has two PCI interfaces for communicating with second and third PCI buses, and an accelerated graphics interface for communicating with the accelerated graphics port. A first PCI bridge communicates between the accelerated graphics interface and the first PCI interface; and a second PCI bridge communicates between the accelerated graphics interface and the second PCI interface.

In still another aspect, a bus connects the accelerated graphics interface to the accelerated graphics port. In yet another aspect, the VLSI device includes a RAM port for connecting the VLSI device to external RAM.

In other aspects, the invention includes at least one SCSI or FC device coupled to the second PCI bus. Preferably, three SCSI or FC devices couple to the second PCI bus. Similarly, in another aspect, the invention includes at least one SCSI or FC device coupled to the third PCI bus; and preferably three SCSI or FC devices couple to the third PCI bus.

The utility device of the invention can for example have ISA bus compatibility. In another aspect, therefore, an ISA bus device couples to the first PCI bus.

In one aspect, the second and third PCI buses operate at higher speeds than the first PCI bus. For example, the first PCI bus can operate at 33 MHz and the second and third PCI buses can operate at higher bus speeds (e.g., 66 MHz).

In yet another aspect, the invention provides a method of communicating between a host CPU chip set and high-speed PCI devices through a RAID cache controller, including the steps of: coupling the RAID cache controller to an accelerated graphics port of the chip set; coupling the RAID controller to a first high-speed PCI bus through a first PCI bridge; coupling the RAID controller to a second high-speed PCI bus through a second PCI bridge; and communicating with devices on the first and second PCI buses through the PCI bridge.

In one aspect, the method can include communicating between the chip set and an accelerator within the RAID controller without interference with communication on either of the first and second PCI buses.

The invention provides several advantages. First, the invention provides a dedicated path to and from the CPU to the RAID cache controller. Second, the invention provides for high speed RAID command traffic between the processor and the RAID cache controller without impacting high-speed RAID data traffic. Third, the invention increases the number of target and host channels by reducing the unit load on the 66 MHz PCI buses. Fourth, the invention removes the latency incurred by prior art architectures when RAID commands cross a PCI bridge. Fifth, the invention allows each 66 MHz PCI bus to interface to the CPU without impacting the other PCI bus. Sixth, the invention isolates the RAID controller's PCI buses from the chip set, permitting 66 MHz, 64-bit operation even though the chip set's PCI bus only supports lower speeds and bandwidths. Those skilled in the art should appreciate that exact processing speeds such as 66 MHz and 33 MHz are used for purposes of illustration and that other chips and controllers utilizing faster or slower speeds are within the scope of the invention.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 2A:
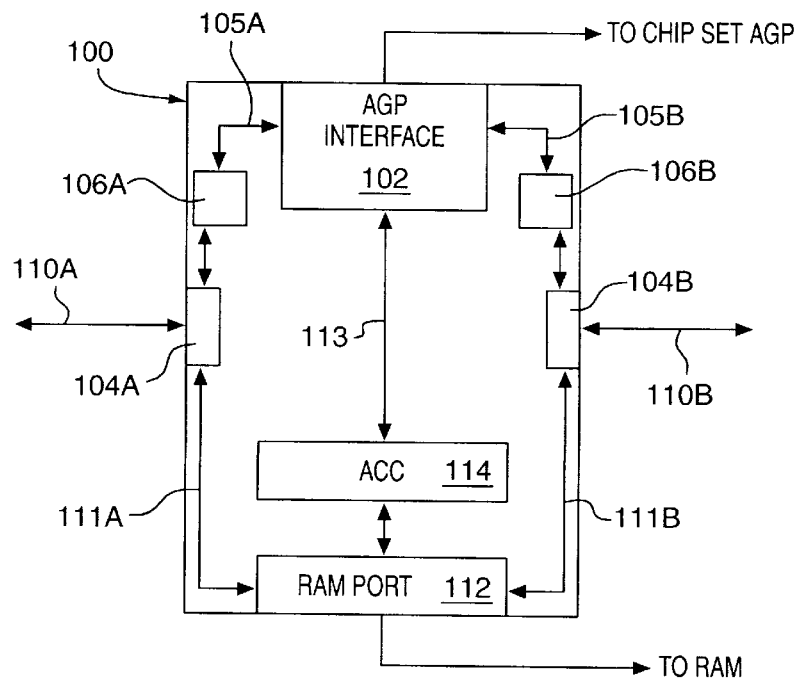
FIG. 2A schematically illustrates architectural detail of one RAID cache controller constructed according to the invention.
Figure 2:
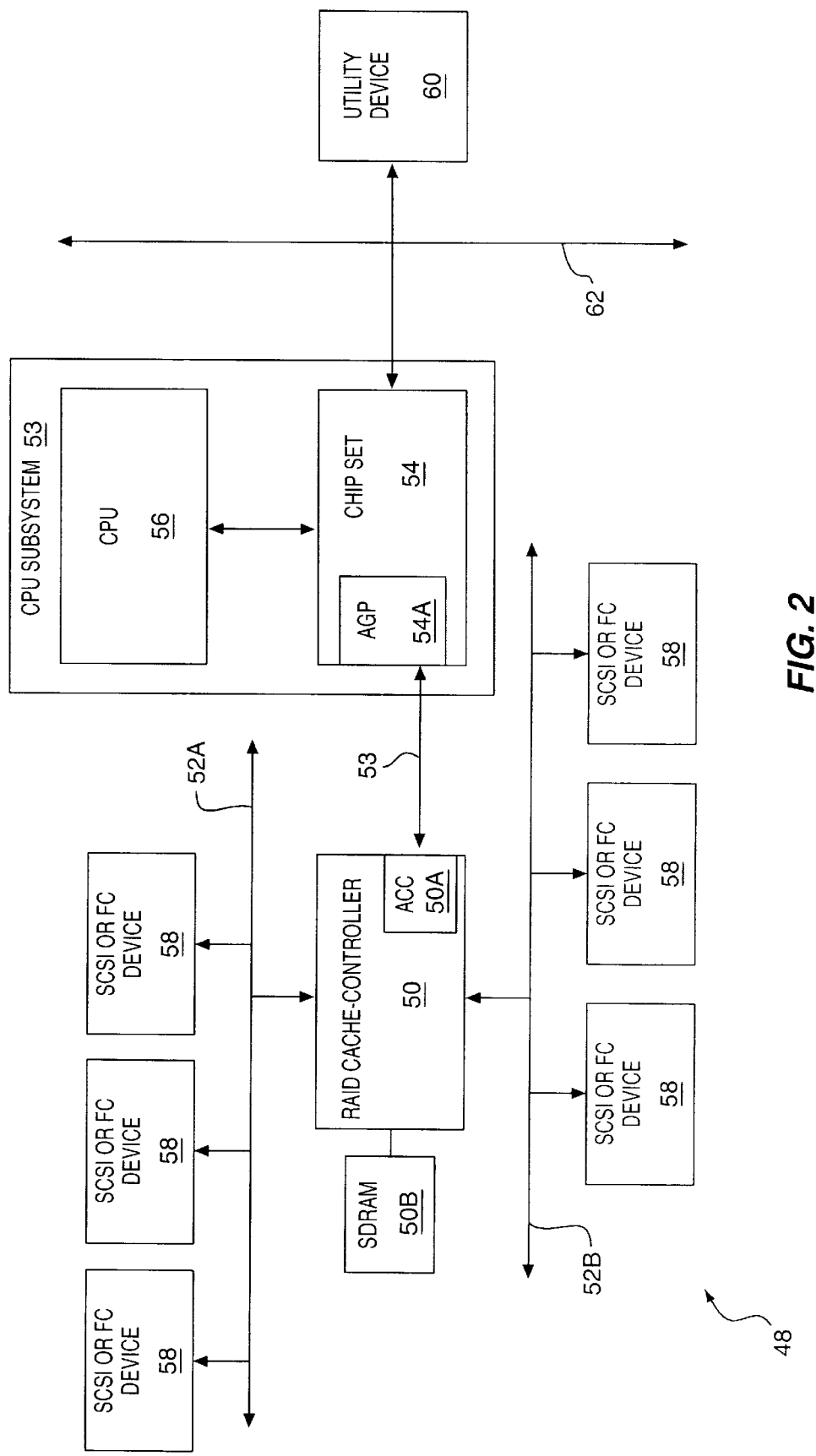
FIG. 2 schematically illustrates a 3-bus PCI system, including a RAID cache controller utilizing the accelerated graphics port (AGP), in accord with the invention.

FIG. 2 schematically illustrates a three bus PCI system 48 constructed according to the invention. System 48 has a PCI-based RAID cache controller 50 connected between PCI buses 52a and 52b operating at enhanced PCI bus speeds (e.g., 66 MHz). The controller 50 connects to the CPU subsystem 53, and specifically to the chip set 54 of the host CPU 56, via the chip set's accelerated graphics port (AGP) 54a.

The chip set 54 and AGP 54a are known in the art. The AGP 54a supports enhanced PCI bus speeds, e.g., 66 MHz or 133 MHz. Since the AGP 54a supports only a single device, the RAID cache controller 50 bridges command and data transfers between the CPU 56 and the target devices 58, e.g., SCSI devices or Fibre Channel chips. The controller 50 includes one or more PCI bridges, such as described above, and can (a) connect to SDRAM 50b and (b) include a system accelerator ("ACC") 50a. Controller 50 is described in more detail in FIG. 2A.

Figure 1:
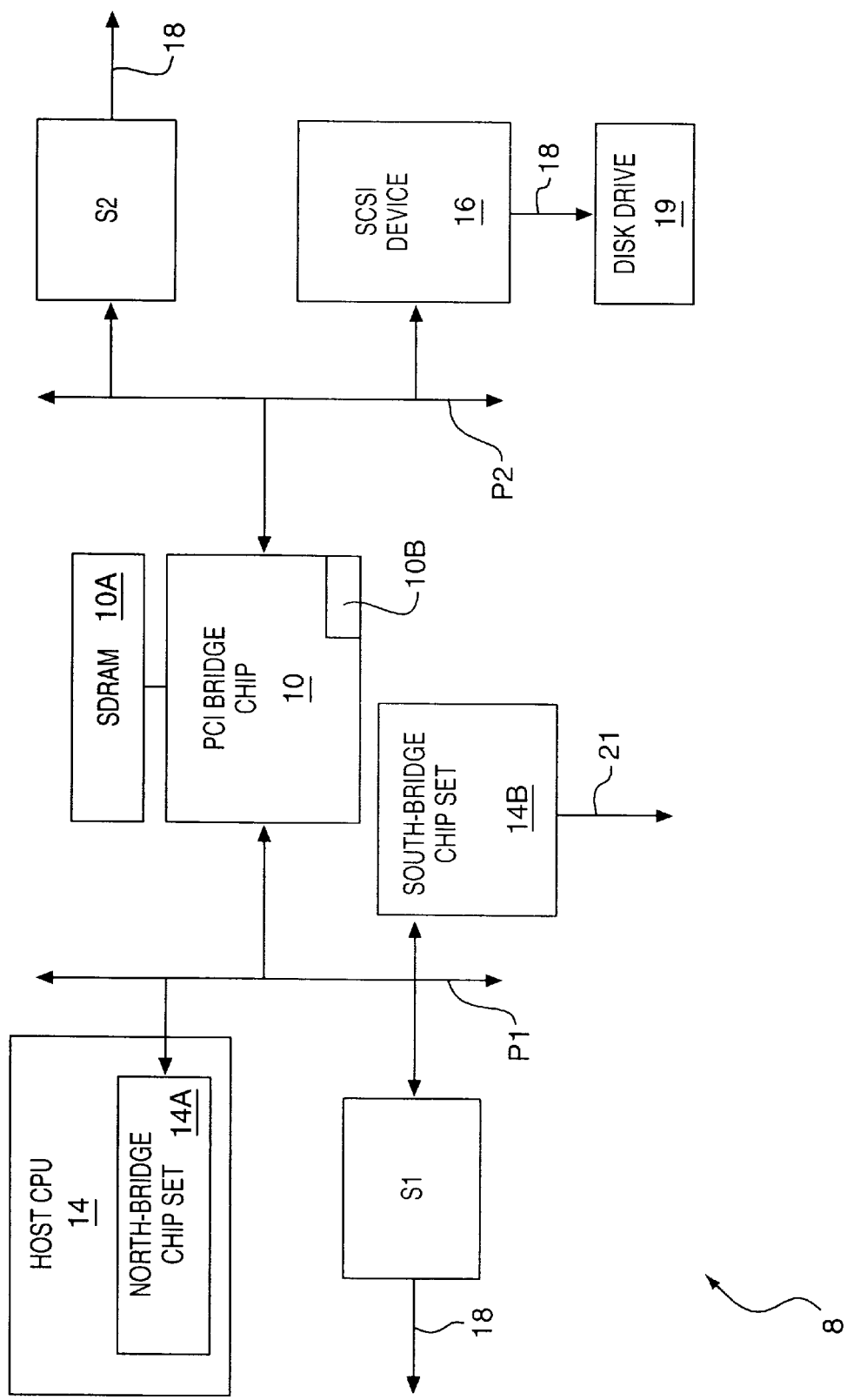
FIG. 1 illustrates a prior art dual PCI bus system and the operation of a prior art PCI bridge chip as connected between two PCI buses.
Figure 1A:
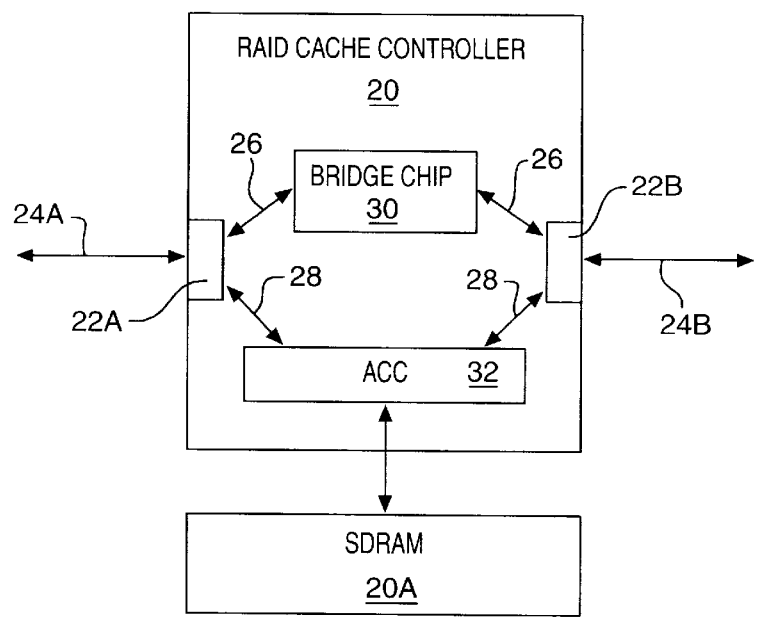
FIG. 1A schematically illustrates architectural detail of the prior art RAID cache controller.

System 48 provides a dedicated communication bus 55 between the controller 50 and the CPU chip set 54 at the enhanced bus speeds (e.g., 66 MHz or 133 MHz) offered by the AGP 54a, providing a significant advantage over the prior art. By way of example, the RAID accelerator 10b, FIG. 1, has to compete with devices S1 and south-bridge 14b for communication to and from the chip set 14a and at lower bus speeds, e.g., 33 MHz. The accelerator 50a of controller 50, on the other hand, has no competition for communication to and from the chip set 54 by connecting directly to the AGP 54a via bus 55 and at the enhanced bus speeds. Accordingly, the invention provides for connectivity with up to six devices 58 operating at enhanced (e.g., 66 MHz) PCI bus speeds, whereas the prior art can only connect for up to four devices, as described above.

By removing the RAID traffic off of the system's main PCI bus 62, bus 62 is free to support lower speed traffic such as network interface cards, ISA bridges, real time clocks, and other devices, collectively illustrated by utility device 60. More particularly, since the controller 50 connects directly to the chip set 54 via the AGP 54a, a high speed, dedicated and processor-independent port is established between the controller 50 and the CPU subsystem 53, thereby freeing the chip set's main PCI bus 62 for use with lower speed devices 60.

System 48 provides another advantage over the prior art in that ISA bus devices 60 need not directly connect to the bus 55 between the controller 50 and the chip set 54a. By way of comparison, ISA bus 21 of FIG. 1 competes on PCI bus P1 and drains P1 bus efficiency.

FIG. 2A illustrates further schematic detail of one controller 100 suitable for use as controller 50 of FIG. 2. The controller 100 includes an AGP interface 102 for connecting to the AGP port of the system chip set, e.g., port 54a, FIG.

2. AGP interface 102 connects to (a) PCI interface 104*a* via bus 105*a* and PCI bridge 106*a*, and to (b) PCI interface 104*b* via bus 105*b* and PCI bridge 106*b*. Interfaces 104 connect to PCI buses 110*a*, 110*b* (such as PCI buses 52*a*, 52*b*, FIG. 2).

Interfaces 104 operate to route data to and from PCI buses 110 according to PCI addressing. As such, interfaces 104 also route data from buses 110, onto buses 111, and to the controller's RAM port 112 connected to external RAM (e.g., SDRAM), as shown.

AGP interface 102 connects via bus 113 to the controller's accelerator 114. The accelerator 114 also connects to the RAM port 112, providing a dedicated high-speed (e.g., 66 MHz) data bus between the controller 100 and CPU memory via its chip set's AGP, and increasing the number of I/Os per second processed by the RAID controller.

The invention thus attains the objects set forth above, among those apparent from the above description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. A RAID cache controller, comprising:
   an accelerated graphics interface for connecting the controller to an accelerated graphics port of a host CPU chip set;
   a first PCI bus interface for coupling the controller to a first PCI bus;
   a second PCI bus interface for coupling the controller to a second PCI bus;
   a RAM port for connecting the controller to external RAM, and a first internal bus connecting the RAM port to the first and second PCI interfaces;
   a first PCI bridge for connecting the accelerated graphics interface to the first PCI bus interface;
   a second PCI bridge for connecting the accelerated graphics port to the second PCI bus interface; and
   an accelerator, coupled to the accelerated graphics interface, for communicating with the chip set without competition on the first and second PCI buses.

2. A RAID cache controller according to claim 1, further comprising a second internal bus for coupling the accelerator to the RAM port.

3. A RAID cache controller according to claim 1, further comprising a third internal bus for coupling the first PCI bridge interface between the accelerated graphics interface and the first PCI interface.

4. A RAID cache controller according to claim 1, further comprising a fourth internal bus for coupling the second PCI bridge interface between the accelerated graphics interface and the second PCI interface.

5. A high-speed, multi-device PCI bus communication system, comprising:
   a host CPU;
   a chip set for connecting the host CPU to a first PCI bus, the chip set having an accelerated graphics port; and
   a VLSI device, including two PCI interfaces for communicating with second and third PCI buses, an accelerated graphics interface for communicating with the accelerated graphics port a first PCI bridge for communicating between the accelerated graphics interface and the first PCI interface; and a second PCI bridge for communicating between the accelerated graphics interface and the second PCI interface.

6. A system according to claim 5, wherein the VLSI device comprises a RAID cache controller.

7. A system according to claim 5, further comprising bus means for connecting the accelerated graphics interface to the accelerated graphics port.

8. A system according to claim 5, wherein the VLSI device comprises a RAM port for connecting the VLSI device to external RAM.

9. A system according to claim 5, further comprising at least one SCSI or FC device coupled to the second PCI bus.

10. A system according to claim 5, further comprising three SCSI or FC devices coupled to the second PCI bus.

11. A system according to claim 5, further comprising at least one SCSI or FC device coupled to the third PCI bus.

12. A system according to claim 5, further comprising three SCSI or FC devices coupled to the third PCI bus.

13. A system according to claim 5, further comprising at least one utility device coupled to the first PCI bus.

14. A system according to claim 13, wherein the utility device comprises ISA bus compatibility.

15. A system according to claim 5, further comprising at least one ISA bus device coupled to the first PCI bus.

16. A system according to claim 5, wherein the second and third PCI buses operate at higher speeds than the first PCI bus.

17. A system according to claim 16, wherein the first PCI bus operates at 33 MHz and wherein the second and third PCI buses operate at a higher bus speed.

18. A system according to claim 17, wherein the higher bus speed comprises 66 MHz.

19. A method of communicating between a host CPU chip set and high-speed PCI devices through a RAID cache controller, comprising:
   coupling the RAID cache controller to an accelerated graphics port of the chip set;
   coupling the RAID controller to a first high-speed PCI bus through a first internal PCI bridge; coupling the RAID controller to a second high-speed PCI bus through a second internal PCI bridge; and
   communicating with devices on the first and second PCI buses through the PCI bridges and accelerated graphics port.

20. A method according to claim 19, further comprising the steps of coupling the chip set to a third PCI bus, the third PCI bus having slower processing speed than the first and second PCI buses, and communicating with one or more utility devices on the third PCI bus.

21. A method according to claim 19, further comprising communicating between the chip set and an accelerator within the RAID controller without interference with communication on either of the first and second PCI buses.

* * * * *